United States Patent
Lindahl et al.

(10) Patent No.: US 7,231,066 B2
(45) Date of Patent: Jun. 12, 2007

(54) SYSTEM AND METHOD FOR INTERPRETATION OF VISUAL INFORMATION

(75) Inventors: Olof Lindahl, Umeå (SE); Robert Forchheimer, Linköping (SE); Haibo Li, Umeå (SE)

(73) Assignee: Videoakt AB, Umea (SE)

( * ) Notice: Subject to any disclaimer, the term of this patent is extended or adjusted under 35 U.S.C. 154(b) by 744 days.

(21) Appl. No.: 10/332,001

(22) PCT Filed: Jul. 5, 2001

(86) PCT No.: PCT/SE01/01569

§ 371 (c)(1),
(2), (4) Date: Mar. 25, 2003

(87) PCT Pub. No.: WO02/03362

PCT Pub. Date: Jan. 10, 2002

(65) Prior Publication Data

US 2003/0161508 A1   Aug. 28, 2003

(30) Foreign Application Priority Data

Jul. 5, 2000   (SE) .................................... 0002535

(51) Int. Cl.
*G06K 9/00* (2006.01)
*G09B 21/00* (2006.01)
*H04B 3/36* (2006.01)
*H04N 7/18* (2006.01)

(52) U.S. Cl. .............. 382/114; 340/407.1; 340/825.19; 348/62

(58) Field of Classification Search ..................... None
See application file for complete search history.

(56) References Cited

U.S. PATENT DOCUMENTS

| | | | | |
|---|---|---|---|---|
| 3,628,193 A | * | 12/1971 | Collins | ........................ 623/24 |
| 3,654,477 A | | 4/1972 | Benjamin, Jr. | |
| 4,097,893 A | * | 6/1978 | Camras | ...................... 348/158 |
| 5,636,038 A | | 6/1997 | Lynt et al. | |
| 5,942,970 A | * | 8/1999 | Norman | .................... 340/407.1 |
| 6,008,721 A | * | 12/1999 | Fingerov et al. | ......... 340/407.1 |
| 6,278,441 B1 | * | 8/2001 | Gouzman et al. | ........... 345/163 |
| 6,658,299 B1 | * | 12/2003 | Dobelle | ....................... 607/54 |

FOREIGN PATENT DOCUMENTS

| | | |
|---|---|---|
| DE | 4337602 A1 | 5/1995 |
| DE | 19510223 A1 | 2/1996 |
| EP | 0766218 A1 | 4/1997 |
| GB | 1113210 A | 5/1968 |

* cited by examiner

*Primary Examiner*—Bhavesh M Mehta
*Assistant Examiner*—Charles Kim
(74) *Attorney, Agent, or Firm*—Ware, Fressola, Van der Sluys & Adolphson LLP

(57) ABSTRACT

In a system (10) and a method for interpreting visual information and transmitting it to a human being through tactile influence of sensorial organs in its body, the system has a sensor module (12) capturing visual information; a control module (14), interpreting the captured information and controlling a tactile actuator module (16) in accordance with the interpreted information. An actuator module (16) transmits the interpreted information to a human being by electro-mechanically influencing sensorial organs in the skin of the human being, thereby creating an image in its brain. An image is corresponding to the visual information transmitted through the electro-mechanical actuator module (16).

6 Claims, 1 Drawing Sheet

SYSTEM AND METHOD FOR INTERPRETATION OF VISUAL INFORMATION

TECHNICAL FIELD

The present invention pertains to a system and a method for interpreting visual information and transmitting it to a human being through tactile influence of sensorial organs on its body.

BACKGROUND ART

There exists a need to increase the ability to view and to interpret a persons physical environment, e.g. for blind or partially blind people, for air force pilots that have to guide a firearm with a "joy stick" trigger while driving a fighter aircraft, for persons enjoying complicated computer games with a growing amount of visual information, for car driving etc.

Hereby a need to combine the human visual system with tactile sensory information is evident in order to increase the human ability to interpret and make more complete decisions upon received real world information.

It has been suggested to develop means for blind persons to read through a tactile sensing in their finger tips, so called Braille reading, using raised-dot patterns for visual letters. There exists more sophisticated instrumentation which converts printed letters recorded by a hand-held camera to enlarged vibrotactile letter on a users fingerpad.

There are also systems that converts an image from a television-type camera to a matrix of electrotactile or vibrotactile stimulators on the abdomen, forehead or fingertip, in order to enable spatial orientation beyond the reach of a hand or long cane. Those systems are only experimental and they do not give any detailed information about objects in the surroundings.

Present systems do not give any information about moving objects or an emotional state of a person during a conversation, which both are important objectives, for example, to a blind or partially blind person.

Air force pilots do guide their firearms with a joy stick or handle adjusting a cross hair to a target on a screen in order to press a fire button at the right moment, and at the same time driving their fighter plane in high speeds. Hence, there is a need to aid a pilot's visual perception in order to improve concentration on the driving of a plane.

Persons playing computer games often use joysticks while watching a screen or display, displaying the games, for example, car race games. A persons visional neural system is then limited and the amount of visual information is large. In order to develop more complicated computer games, the rate of visual information has to be increased, thus providing a greater stress to persons playing said games.

Patent application document DE 43 37 602 A1 describes a dynamic orientation aid and a television simulator for blind people, operating with real time tactile feedback controlled through a computer.

U.S. Pat. No. 5,636,038 by Lynt et al. discloses an apparatus for converting visual images into a tactile representation. It is aimed to be used by visually impaired people.

U.S. Pat. No. 3,654,477 by Benjamin discloses an obstacle detection system for blind mounted on spectacle frames.

None of the cited documents teaches how to enhance a seeing persons visual perception. It is inevitable that a device that enhances visual perception for seeing persons can also be used by visually impaired people.

SUMMARY OF THE DESCRIBED INVENTION

A purpose of the present invention is to overcome disadvantages and drawbacks with currently available systems through increasing the ability of a human brain to interpret additional visual information through tactile video seeing.

Hence, in order to overcome the disadvantages with present systems, the present invention can provide emotional and rich perception visual information to blind persons as well as increase the visual perception of human beings in situations were it is needed.

In order to achieve purposes and advantages of the present invention it sets forth a system for interpreting visual information and transmitting it to a human being through tactile influence of sensorial organs in its body. It comprises:

a sensor capturing the visual information;

a control means, interpreting the captured information and controlling a tactile actuator in accordance with the interpreted information; and the actuator transmitting the interpreted information to a human being by electro-mechanically influencing sensorial regions in the skin of the human being, thereby creating an image in the brain of the human being, the image corresponding to the visual information through the electro-mechanical transmission.

Hence, enhancing the seeing of the human being by making conscious two images of one and the same instance in the brain of the human being through seeing the captured visual sensor module information and simultaneously receiving the captured information as a tactile information made conscious in the brain.

In one embodiment of the invention it is provided in a handheld device, so that it can be pointed in any direction providing the visual information as tactile information to a hand or its fingers and further to the brain.

In another embodiment it is comprised in a device with a display, whereby the device provides the visual information directly and indirectly.

A further embodiment comprises that it is providing conscious information to the brain about moving objects or an emotional state through the modules.

A still further embodiment comprises an actuator transforming a recorded video signal into a pattern, the pattern being sensed by a human beings sensorial receptors and interpreted into a conscious picture in the brain.

Another embodiment comprises that images are processed through independent LLVP modules corresponding to different visual cues are extracted, in parallel.

Yet another embodiment comprises that cues are representing color, motion, shape, range, texture, and other visual primitives.

Yet a still further embodiment comprises that means LLVP and HLVP making up the control module are having multiple connections to each other.

The present invention also sets forth a method for interpreting visual information and transmitting it to a human being through tactile influence of sensorial organs in its body. The method comprises the steps of:

capturing the visual information;

controlling and interpreting the captured information and controlling a tactile actuator in accordance with the interpreted information; and transmitting the interpreted information to a human being by electromechanically influencing sensorial regions in the skin of the human being, thereby creating an image in the brain of the human being, the image corresponding to the visual information through the electro-mechanical transmission.

It enhances the seeing of said human being by making conscious two images of one and the same instance in the brain of said human being through seeing said captured visual sensor module information and simultaneously receiving the captured information as a tactile information made conscious in the brain.

One embodiment of the method provides a handheld device, so that it can be pointed in any direction providing the visual information as tactile information to a hand or its fingers and further to the brain.

Another embodiment of the method of the present invention provides that a device with a display, whereby the device provides the visual information directly and indirectly.

In a further embodiment it is providing conscious information to the brain about moving objects or an emotional state.

Another embodiment provides an actuator transforming a recorded video signal into a pattern, the pattern being sensed by a huming beings sensorial receptors and interpreted into a conscious picture in the brain.

In a further embodiment images are processed through independent LLVP modules through which different visual cues are extracted, in parallel.

A further embodiment provides that cues are representing color, motion, shape, range, texture, and other visual primitives.

A yet further embodiment provides that means LLVP and HLVP making up the control module are having multiple connections to each other.

BRIEF DESCRIPTION OF THE DRAWING

Henceforth reference is had to the attached drawings throughout the description for a better understanding of the present invention with its examples and embodiments, whereby.

DETAILED DESCRIPTION OF PREFERRED EMBODIMENTS

A main purpose of the present invention is to overcome disadvantages and drawbacks with currently available systems through increasing the ability of a human brain to interpret additional visual information through tactile video seeing. Hence making possible to, for example, making conscious two images of one instance in the brain of a human being, one through a camera and one through tactile feedback. Inevitable a device that enhances visual perception for seeing persons can also be used by visually impaired people. But then not making conscious two images of one and the same instance.

A fact is that a human beings visual neural system is not the only channel for its brain to "watch" or percept the outside world and its environment. An objective exemplifying this is to guide a blind person with the aid of a CCD-camera attached to said person, which visualizes e.g. a wall, room, table etc. in front of the person, or emotional information. Emotional information provided by the camera could for example be of the type relating to the mood of a camera recorded person, for example, if a person has an angry face or a happy face. According to the present invention it transmits recorded information to, for example, a piezoelectric actuator, which transforms a recorded video signal into a pattern. The pattern is sensed, in one embodiment of the present invention, by a persons sensorial receptors in a finger tip and interpreted into a conscious picture in the brain. The actuator can be attached to the finger tip and have the size of about 1 $cm^2$. It can transform the video information by e.g. activating small piezoelectric dots in a matrix on the actuator.

Figure 1:
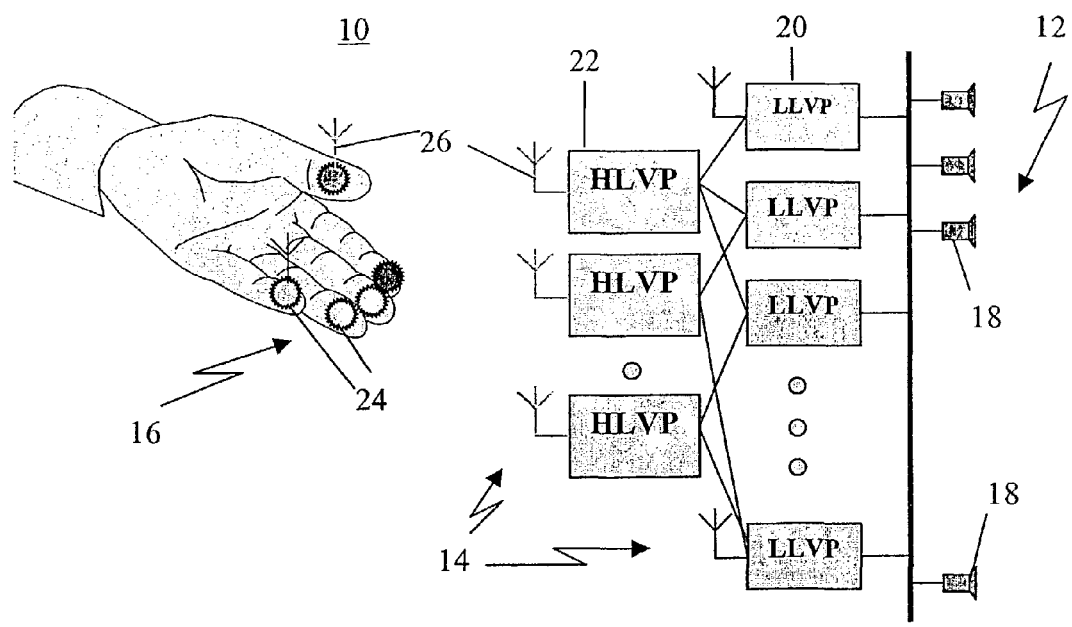
FIG. 1 is schematically illustrating a tactile video system in accordance with the present invention.

FIG. 1 schematically depicts one embodiment of a tactile video system 10 in accordance with the present invention The tactile video system 10 consists of three subsystems: imaging system 12, image understanding system 14, and tactile actuator system 16.

The imaging system 12 is used to provide rich imaging signals by means of required sensors 18. Sensed signals may be obtained from visible light, infrared light, sonic signal, or a combination of them as known to a person skilled in the art. The system 10 is also able to use a video camera array as imaging system 12 specially designed to satisfy specific requirements, for example, stereo video.

The image understanding system 14 contains two kinds of image understanding modules as known to a person skilled in the art, Low-level visual processing (LLVP) 20 and High-level visual processing (HLVP) 22. Images are processed through independent LLVP modules through which different visual cues are extracted, in parallel. These cues representing color, motion, shape, range, texture, and other visual primitives can be wirelessly transmitted to tactile actuators 24. Wireless transmitting systems are those known in the art such as electromagnetic, ultra-sound. These are marked or indicated with an antenna 26 symbol in FIG. 1.

In contrast, HLVP modules 22 provide more about image understanding based on visual cues. High-level description of images is provided, for example, through a facial expression reader as known to persons skilled in the art.

The tactile actuators 24 can be attached to the finger tip(s). Such actuators are able to transform visual information by e.g. activating small piezoelectric dots in a matrix on a actuator 22.

Figure 2:
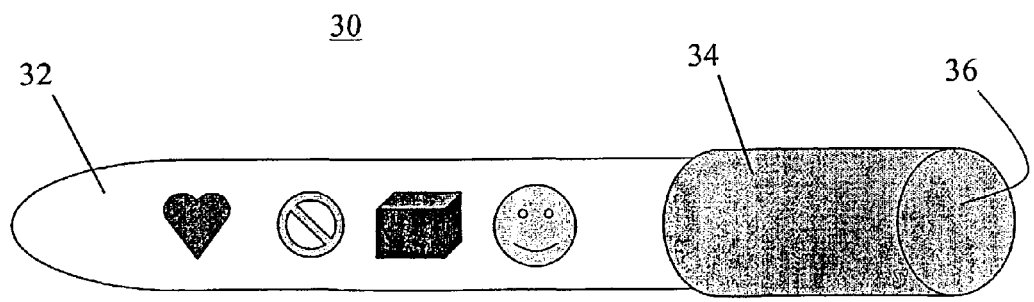
FIG. 2 is schematically illustrating a navigator for tactile stimulation of different emotional, spatial information and orientation.

FIG. 2 depicts a "flashlight-like" navigator 30 to be handheld for tactile stimulation of different emotional and spatial information and orientation as illustrated by self explaining symbols on the tactile surface 32. The video camera 34 or the like obtains reflected light from objects through its camera opening 36. It is appreciated that all symbols could be expressed by one tactile actuator 24.

Extracted visual information is displayed on the surface of the flashlight-like navigator 30 which integrates all three modules 12, 14 16 described above. Besides, the big advantage for the navigator is that high resolution visual information can be displayed, by which people can actively and selectively percept the environment e.g. spatial as well as emotional information, by pointing in any direction with the handheld flashlight-like navigator 30.

An embodiment of the present invention provides a system 10 for interpreting visual information and transmitting it to a human being through tactile influence 16 of sensorial organs on its body. The system 10 thus comprises:

a sensor module 12 capturing the visual information;

a control module 14, interpreting the captured information and controlling a tactile actuator module 16 in accordance with the interpreted information; and the actuator module 16 transmitting the interpreted information to a human being by electro-mechanically influencing sensorial regions in the skin of the human being, thereby creating or making conscious an image in the brain of the human being, the image corresponding to the visual information through the electro-mechanical transmission.

Hence it enhances the seeing of a human being by making conscious two images of one and the same instance in the brain of the human being through seeing the captured visual sensor module information and simultaneously receiving the captured information as a tactile information made conscious in the brain.

Embodiments of the system 10 relating to special applications in order to show examples of the advantages with the present invention are described below. It is inevitable that a device that enhances visual perception for seeing persons also can be used by visually impaired people, which is stated by some of the examples:

Road-guiding for Blind Persons: For blind persons a video camera pointing towards the road is mounted to their head, or using a flashlight-like navigator as depicted in FIG. 2. The recorded road video is fed into the tactile video equipment in accordance with the present invention, which can be attached onto the back of the blind person. According to this design example, the blind person will be able to "see" the road through a conscious picture in the brain;

Mimic Reading by a Blind Person: An example, supposing that a blind person has two tactile sensors attached to two fingers: one provides human face outline information from LLVP module 20, see FIG. 1, and another sensor providing facial expression information from HLVP module 24. According to face outline information the person could turn his head (attached video camera) to make the face of, for example, a friend be better focussed. Hence, the person could understand the emotion of his friend from his facial expression information;

Possibility for a Blind Person to Watch Sport TV: Providing position information from a sports arena through the TV-screen to the fingertips of the person;

Multimedia Entertainment: Since the present invention makes it possible to watch videos with closed eyes, this could be used for fan or entertainment, for example, through websurfing with closed eyes;

Air force pilots: In order to guide the firing of a fighter planes guns a tactile actuator, for example, a dot matrix like the above described cross hair on a steering joystick can guide the pilot through finger tips;

Computer games: A dot matrix in a joystick can provide additional visual information to a players fingertip(s) e.g. movement and speed information;

Car Steering wheel: Actuators in the steering wheel of a car providing information to a driver so that the driver can concentrate ahead a road not needing to turn his head unnecessarily; and other possible applications for a person skilled in the art.

The present invention is not intended to be limited to the above described embodiments. The attached set of claims provides the scope of the invention to a person skilled in the art.

What is claimed is:

1. A system for interpreting visual information and transmitting such visual information to a human being through tactile influence of sensorial organs in its body comprising:
   a sensor module capturing the visual information;
   a control module communicating with the sensor module and interpreting the captured visual information; and
   a tactile actuator module controlled by the control module in accordance with the interpreted information and able to transmit the interpreted information to a human being by electro-mechanically influencing sensorial regions in the skin of the human being, thereby making conscious an image in the brain of the human being, the image corresponding to the visual information through the electro-mechanical transmission, and enhancing the seeing of the human being by making conscious two images of one and the same instance in the brain of the human being through seeing the captured visual sensor module information and simultaneously receiving the captured information as a tactile information made conscious in the brain, wherein conscious information is provided to the brain about emotional state through the modules.

2. A system for interpreting visual information and transmitting such visual information to a human being through tactile influence of sensorial organs in its body comprising:
   a sensor module capturing the visual information;
   a control module communicating with the sensor module and interpreting the captured visual information, wherein the control module processes images through independent low level visual processing modules through which different visual cues are extracted in parallel, the cues represent color, motion, shape, range, texture and other visual primitives; and
   a tactile actuator module controlled by the control module in accordance with the interpreted information and able to transmit the interpreted information to a human being by electro-mechanically influencing sensorial regions organs in the skin of the human being, thereby making conscious an image in the brain of the human being, the image corresponding to the visual information through the electro-mechanical transmission, and enhancing the seeing of the human being by making conscious two images of one and the same instance in the brain of the human being through seeing the captured visual sensor module information and simultaneously receiving the captured information as a tactile information made conscious in the brain.

3. A system for interpreting visual information and transmitting such visual information to a human being through tactile influence of sensorial organs in its body comprising:
   a sensor module capturing the visual information;
   a control module communicating with the sensor module and interpreting the captured visual information, wherein the control module has low level visual processing and high level visual processing having multiple connections to each other; and
   a tactile actuator module controlled by the control module in accordance with the interpreted information and able to transmit the interpreted information to a human being by electro-mechanically influencing sensorial regions in the skin of the human being, thereby making conscious an image in the brain of the human being, the image corresponding to the visual information through the electro-mechanical transmission, and enhancing the seeing of the human being by making conscious two images of one and the same instance in the brain of the human being through seeing the captured visual sensor module information and simultaneously receiving the captured information as a tactile information made conscious in the brain.

4. A method for interpreting visual information and transmitting such visual information to a human being through tactile influence of sensorial organs in its body, comprising the steps of:

capturing the visual information;

controlling and interpreting the captured information and controlling a tactile actuator in accordance with the interpreted information; and transmitting the interpreted information to a human being by electro-mechanically influencing sensorial regions in the skin of the human being, thereby making conscious an image in the brain of the human being, the image corresponding to the visual information through the electro-mechanical transmission and enhancing the seeing of the human being by making conscious two images of one and the same instance in the brain of the human being through seeing the captured visual sensor module information and simultaneously receiving the captured information as a tactile information made conscious in the brain, wherein conscious information is provided to the brain about emotional state.

5. A method for interpreting visual information and transmitting such visual information to a human being through tactile influence of sensorial organs in its body, comprising the steps of:

capturing the visual information; and controlling and interpreting the captured information and controlling a tactile actuator in accordance with the interpreted information, wherein during the controlling and interpreting of the captured information step, images are processed through independent low level visual processing modules through which different visual cues are extracted in parallel, the cues are representing color, motion, shape, range, texture and other visual primitives; and transmitting the interpreted information to a human being by electro-mechanically influencing sensorial regions in the skin of the human being, thereby making conscious an image in the brain of the human being, the image corresponding to the visual information through the electro-mechanical transmission and enhancing the seeing of the human being by making conscious two images of one and the same instance in the brain of the human being through seeing the captured visual sensor module information and simultaneously receiving the captured information as a tactile information made conscious in the brain.

6. A method for interpreting visual information and transmitting such visual information to a human being through tactile influence of sensorial organs in its body, comprising the steps of:

capturing the visual information;

controlling and interpreting the captured information and controlling a tactile actuator in accordance with the interpreted information, wherein the controlling and interpreting visual information step is conducted by low level visual processing and high level visual processing modules having multiple connections to each other; and transmitting the interpreted information to a human being by electro-mechanically influencing sensorial regions in the skin of the human being, thereby making conscious an image in the brain of the human being, the image corresponding to the visual information through the electro-mechanical transmission and enhancing the seeing of the human being by making conscious two images of one and the same instance in the brain of the human being through seeing the captured visual sensor module information and simultaneously receiving the captured information as a tactile information made conscious in the brain.

* * * * *

UNITED STATES PATENT AND TRADEMARK OFFICE
CERTIFICATE OF CORRECTION

PATENT NO. : 7,231,066 B2 Page 1 of 1
APPLICATION NO. : 10/332001
DATED : June 12, 2007
INVENTOR(S) : Olof Lindahl et al.

It is certified that error appears in the above-identified patent and that said Letters Patent is hereby corrected as shown below:

Column 1:

line 31, "converts" should be -- convert --.

Column 2:

line 14, "were" should be -- where --.

Column 3:

line 24, "huming" should be -- human --.

Column 5:

line 42, "fan" should be -- fun --.

Column 6:

line 34 (claim 2, line 16), "organs" should be deleted.

Signed and Sealed this

Seventh Day of August, 2007

JON W. DUDAS
*Director of the United States Patent and Trademark Office*